a2a (12) United States Patent
Degawa et al.

(10) Patent No.: US 11,155,274 B2
(45) Date of Patent: Oct. 26, 2021

(54) VEHICLE TRAVEL CONTROL METHOD AND VEHICLE TRAVEL CONTROL DEVICE

(71) Applicant: Nissan Motor Co., Ltd., Yokohama (JP)

(72) Inventors: Katsuhiko Degawa, Kanagawa (JP); Takahiro Nojiri, Kanagawa (JP); Tatsuya Shino, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/631,045

(22) PCT Filed: Jul. 20, 2017

(86) PCT No.: PCT/JP2017/026282
§ 371 (c)(1),
(2) Date: Jan. 14, 2020

(87) PCT Pub. No.: WO2019/016915
PCT Pub. Date: Jan. 24, 2019

(65) Prior Publication Data
US 2020/0148221 A1 May 14, 2020

(51) Int. Cl.
*B60W 50/14* (2020.01)
*B60W 60/00* (2020.01)
(Continued)

(52) U.S. Cl.
CPC ............ *B60W 50/14* (2013.01); *B60W 10/04* (2013.01); *B60W 10/18* (2013.01); *B60W 10/20* (2013.01); *B60W 30/18* (2013.01); *B60W 60/001* (2020.02); *B60W 2050/0072* (2013.01); *B60W 2050/143* (2013.01); *B60W 2555/60* (2020.02); *B60W 2710/18* (2013.01); *B60W 2710/20* (2013.01); *B60W 2720/106* (2013.01)

(58) Field of Classification Search
CPC ..................................................... B60W 30/00
See application file for complete search history.

(56) References Cited

U.S. PATENT DOCUMENTS 9,126,594 B2   9/2015   Kawamata et al.
9,254,846 B2   2/2016   Dolgov et al.
(Continued)

FOREIGN PATENT DOCUMENTS

CN   104221066 A   12/2014
CN   105074793 A   11/2015
(Continued)

OTHER PUBLICATIONS

Machine Translation from JPO of Japanese Patent Pub. No. 2013-086580A to Ito (Jul. 6, 2020 downloaded).*
(Continued)

*Primary Examiner* — Jean Paul Cass
(74) *Attorney, Agent, or Firm* — Young Basile Hanlon & MacFarlane, P.C.

(57) ABSTRACT

A travel-lane determination unit determines whether a vehicle is going to enter a traffic lane on which a toll booth is provided. After it is determined that the vehicle is going to enter the traffic lane, a travel control unit stops the vehicle at a position before the toll booth in a travel direction of the vehicle.

8 Claims, 4 Drawing Sheets

(51) Int. Cl.
*B60W 10/04* (2006.01)
*B60W 10/18* (2012.01)
*B60W 10/20* (2006.01)
*B60W 30/18* (2012.01)
*B60W 50/00* (2006.01)

(56) References Cited

U.S. PATENT DOCUMENTS

| | | | |
|---|---|---|---|
| 9,381,917 | B1 | 7/2016 | Dolgov et al. |
| 9,443,427 | B1* | 9/2016 | Bhuiya ............... G08G 1/22 |
| 9,561,797 | B2 | 2/2017 | Dolgov et al. |
| 9,707,913 | B1* | 7/2017 | Ochiai ............ B60N 2/0248 |
| 9,802,622 | B2 | 10/2017 | Park |
| 9,940,834 | B1* | 4/2018 | Konrardy ........... G08G 1/161 |
| 9,964,414 | B2 | 5/2018 | Slavin et al. |
| 9,972,054 | B1* | 5/2018 | Konrardy .......... B60W 50/0205 |
| 10,001,777 | B2 | 6/2018 | Ebina |
| 10,156,636 | B1* | 12/2018 | Minoric ............. G08G 1/09 |
| 10,156,848 | B1* | 12/2018 | Konrardy .......... G01C 21/362 |
| 10,185,998 | B1* | 1/2019 | Konrardy ........... G08G 1/005 |
| 10,204,459 | B1* | 2/2019 | Martin ............ G07B 15/063 |
| 10,319,039 | B1* | 6/2019 | Konrardy ........... G06Q 40/08 |
| 10,373,259 | B1* | 8/2019 | Konrardy ........... G06Q 40/00 |
| 10,395,332 | B1* | 8/2019 | Konrardy ......... G06F 16/90335 |
| 10,693,632 | B1* | 6/2020 | Winklevoss ......... H04L 9/0825 |
| 10,794,720 | B2 | 10/2020 | Slavin et al. |
| 2014/0278052 | A1 | 9/2014 | Slavin et al. |
| 2014/0330479 | A1* | 11/2014 | Dolgov ............ B60W 30/143 701/28 |
| 2015/0046038 | A1* | 2/2015 | Kawamata ........... B60W 50/14 701/41 |
| 2016/0107655 | A1 | 4/2016 | Desnoyer et al. |
| 2016/0180604 | A1* | 6/2016 | Wilson ............. G07B 15/063 705/4 |
| 2016/0214607 | A1 | 7/2016 | Dolgov et al. |
| 2016/0272207 | A1 | 9/2016 | Dolgov et al. |
| 2017/0001650 | A1 | 1/2017 | Park |
| 2017/0038774 | A1 | 2/2017 | Ebina |
| 2017/0046883 | A1* | 2/2017 | Gordon ............. G05D 1/0088 |
| 2018/0088572 | A1 | 3/2018 | Uchida et al. |
| 2018/0154893 | A1 | 6/2018 | Izuhara et al. |
| 2018/0154898 | A1* | 6/2018 | Wrobel ............. B60W 10/26 |
| 2018/0174446 | A1* | 6/2018 | Wang ............... G08G 1/017 |
| 2018/0203455 | A1 | 7/2018 | Cronin et al. |
| 2018/0299290 | A1 | 10/2018 | Slavin et al. |
| 2019/0016341 | A1* | 1/2019 | Nelson ............. B60W 40/06 |
| 2019/0122449 | A1* | 4/2019 | Rosas-Maxemin .... G08G 1/146 |
| 2019/0176837 | A1* | 6/2019 | Williams ........... B60W 50/02 |
| 2019/0243371 | A1* | 8/2019 | Nister ............. G05D 1/0231 |
| 2019/0258251 | A1* | 8/2019 | Ditty ............ G06K 9/00805 |
| 2019/0286153 | A1* | 9/2019 | Rankawat ............ G06T 7/11 |
| 2019/0302761 | A1* | 10/2019 | Huang ............. G02B 27/017 |
| 2019/0384304 | A1* | 12/2019 | Towal ............. G05D 1/0221 |
| 2020/0013291 | A1* | 1/2020 | Rosas-Maxemin .... G07B 15/02 |
| 2020/0211071 | A1* | 7/2020 | Rosas-Maxemin .... G06N 20/20 |
| 2021/0026355 | A1* | 1/2021 | Chen ............ G06K 9/00791 |
| 2021/0088784 | A1* | 3/2021 | Whitmire .......... G06K 9/6273 |
| 2021/0150230 | A1* | 5/2021 | Smolyanskiy ....... G06K 9/3233 |
| 2021/0156960 | A1* | 5/2021 | Popov ............. G01S 13/89 |
| 2021/0156963 | A1* | 5/2021 | Popov ............. G01S 13/89 |

FOREIGN PATENT DOCUMENTS

| | | | | |
|---|---|---|---|---|
| CN | 105358397 | A | | 2/2016 |
| CN | 106233356 | A | | 12/2016 |
| CN | 106314152 | A | | 1/2017 |
| DE | 102011087791 | A1 | | 6/2013 |
| DE | 10201312278 | | * | 12/2014 ........... B60W 30/00 |
| JP | 2004355145 | A | | 12/2004 |
| JP | 2009154735 | A | | 7/2009 |
| JP | 2013086580 | A | | 5/2013 |
| JP | 2015118438 | A | | 6/2015 |
| JP | 2016137819 | A | | 8/2016 |
| JP | 2016222170 | A | | 12/2016 |
| JP | 2017013605 | A | | 1/2017 |
| JP | 2017054170 | A | | 3/2017 |
| KR | 20170015115 | A | | 2/2017 |

OTHER PUBLICATIONS

Machine Translation from JPC of Japanese Patent Pub. No. JP 2016-222170 A to Izuhara et al. (Jul. 6, 2020 downloaded).*

English Machine Translation of Japanese Patent Pub. No. JP2018538611A (Nov. 4, 2015).*

* cited by examiner

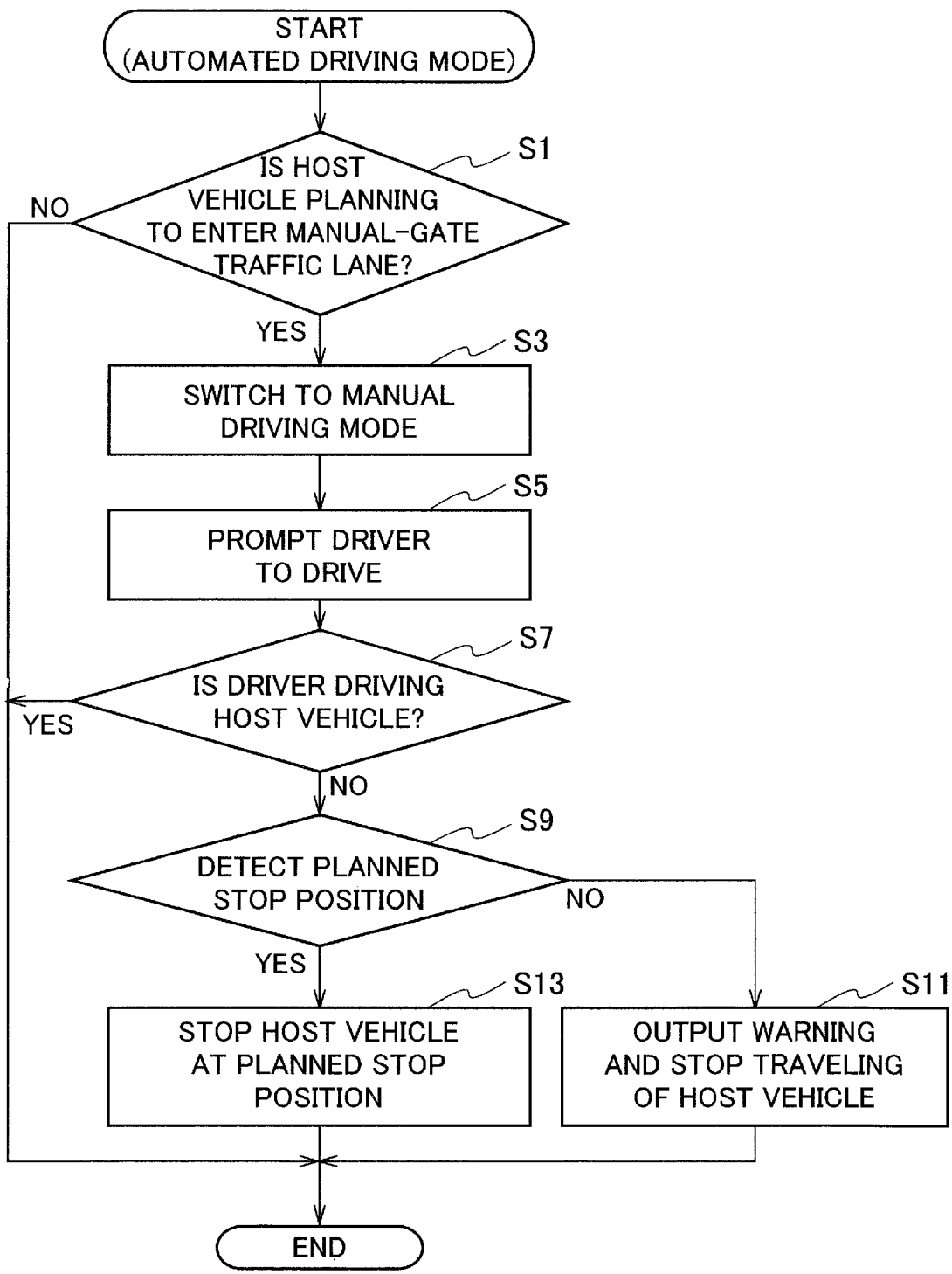

VEHICLE TRAVEL CONTROL METHOD AND VEHICLE TRAVEL CONTROL DEVICE

TECHNICAL FIELD

The present invention relates to vehicle travel control methods and vehicle travel control devices.

BACKGROUND

A conventional technique has been disclosed in Japanese Patent Application Publication No. 2004-355145 which in the case where a vehicle is approaching an ETC (registered trademark), speed control is performed, and in the case where the vehicle is approaching a manned toll gate, the user is notified of disengagement of the speed control.

SUMMARY

The above technique is based on the assumption that for a manned toll gate, the driver stops the vehicle after the notification because the driver is notified of the disengagement of the speed control. Hence, if the driver does not stop the vehicle by operation, the vehicle may travel with its inertia and pass by the manned toll gate.

The present invention has been made in light of the above problem, and an object thereof is to provide a vehicle travel control method and vehicle travel control device that are capable of preventing a vehicle from passing by in front of a toll booth provided on a traffic lane.

A vehicle travel control method according to an aspect of the present invention includes, after it is determined that a vehicle is going to enter a traffic lane on which a toll booth is provided, stopping the vehicle at a position before the toll booth in a travel direction of the vehicle.

The present invention makes it possible to prevent a vehicle from passing by in front of a toll booth provided on a traffic lane.

BRIEF DESCRIPTION OF THE DRAWINGS

FIG. 2 is a flowchart for explaining a vehicle travel control method performed by an ECU 1;

DETAILED DESCRIPTION

Next, an embodiment of the present invention will be described in detail with reference to the drawings. In the description, the same constituents will be denoted by the same symbols, and repetitive description thereof will be omitted.

Figure 1:
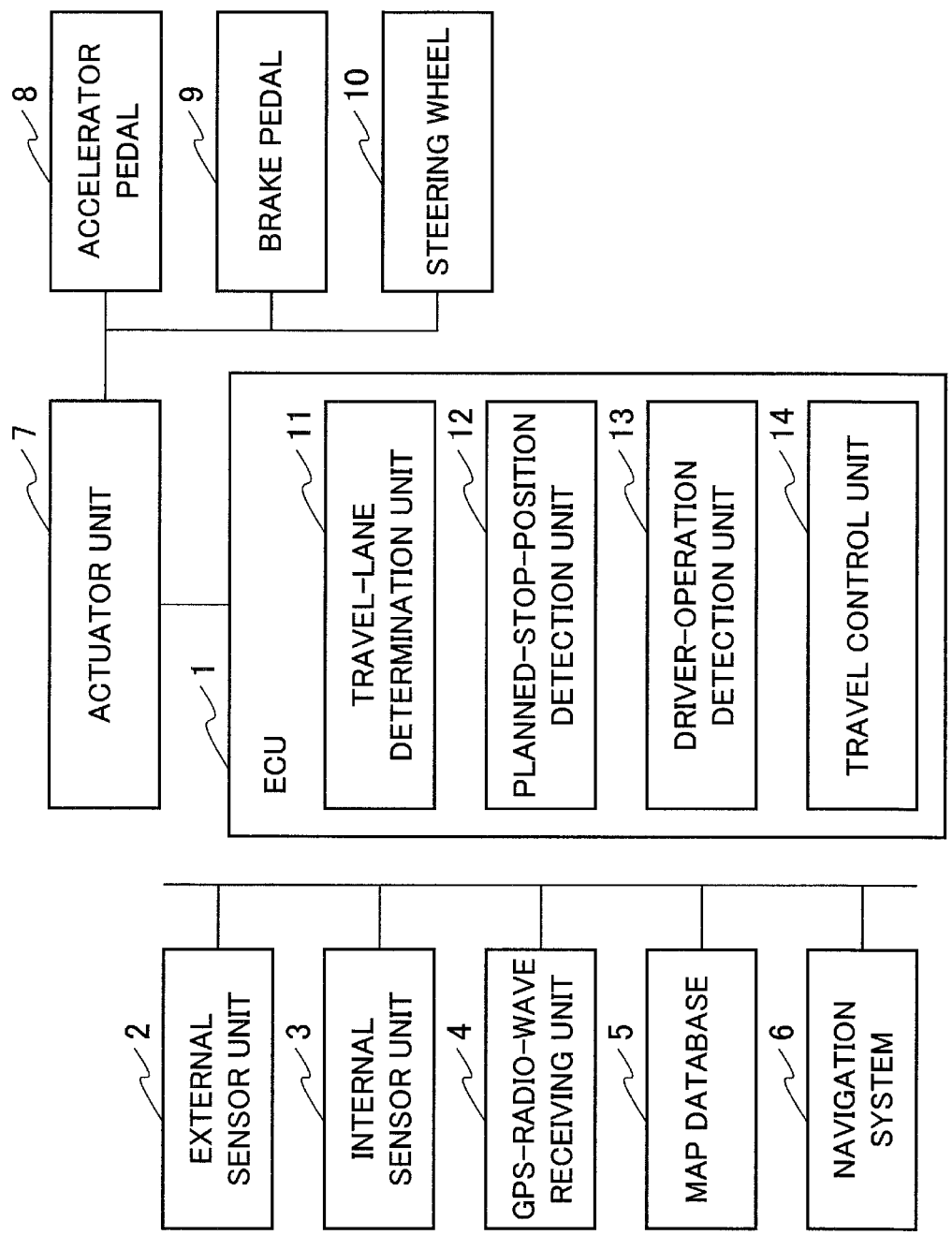
FIG. 1 is a functional block diagram illustrating part of a vehicle equipped with a vehicle travel control device according to an embodiment of the present invention.

As illustrated in FIG. 1, a vehicle includes an ECU (electronic control unit) 1, external sensor unit 2, internal sensor unit 3, GPS (Global Positioning System)-radio-wave receiving unit 4, map database 5, navigation system 6, actuator unit 7, accelerator pedal 8, brake pedal 9, and steering wheel 10. This vehicle is called the "host vehicle" to prevent this vehicle from being confused with other vehicles.

The ECU 1 corresponds to a vehicle travel control device that automatically stops the host vehicle and can be implemented by using a microcomputer including a CPU (central processing unit), memory, and an input-output unit. A computer program that causes a microcomputer to function as the ECU 1 is installed into and executed by the microcomputer. This allows the microcomputer to function as the ECU 1. Note that although here an example in which the ECU 1 is implemented by software will be described, as a matter of course the ECU 1 can be implemented by dedicated hardware prepared for executing each information process to be described below.

The external sensor unit 2 includes a radar device or a camera (both not illustrated) and outputs, to the ECU 1, images or the positional information of objects around the host vehicle obtained from the radar device or camera. The camera also detects traffic lanes. The internal sensor unit 3 detects the operation amount of the accelerator pedal 8 (driving force), the operation amount of the brake pedal 9 (braking force), and the steering angle of the steering wheel 10 (steering amount) and outputs the detection results to the ECU 1.

The GPS-radio-wave receiving unit 4 obtains the position of the host vehicle by receiving radio waves from three or more GPS satellites and outputs the position to the ECU 1 and the navigation system 6.

The map database 5 includes map information of the areas where the host vehicle travels, and the ECU 1 and the navigation system 6 refer to the map information. The map information includes information on the positions or the like of roads, intersections, and toll booths provided on toll roads.

Information on toll booths includes information on traffic lanes provided with an "automatic toll gate" at which a vehicle can hand or receive fees and tickets by vehicle-road wireless communication without stopping (the automatic-toll-gate traffic lane) and information on traffic lanes provided with a "manual gate" at which vehicle stops temporarily for the occupants of the vehicles to hand or receive fees and tickets (manual-gate traffic lane). Here, as described above, traffic lanes on which an automatic toll gate is not provided are called "manual-gate traffic lanes". It can be understood that traffic lanes that are provided with an automatic toll gate which however is out of order and at which so a person needs to do actions such as receiving fees are regarded as manual-gate traffic lanes. It can also be understood that traffic lanes on which a manned toll booth is provided instead of an automatic toll gate are regarded as manual-gate traffic lanes. For a manual-gate traffic lane, a vehicle needs to stop at a toll booth for a person to hand or receive a fee and a ticket.

The information on a manual-gate traffic lane includes the position of the manual-gate traffic lane, the positions of the entrance and exit of the manual-gate traffic lane for vehicles, the traffic-lane width, and the length of the manual-gate traffic lane. Hereinafter, the entrance and exit of a manual-gate traffic lane for vehicles are simply called the entrance and exit of a manual-gate traffic lane.

The navigation system 6 guides the host vehicle to the destination set by an occupant such as the driver of the host vehicle. The navigation system 6, based on each piece of information outputted by the external sensor unit 2, the internal sensor unit 3, and the GPS-radio-wave receiving unit 4, calculates planned travelling roads to the destination and guides the host vehicle to the destination. The occupant sets whether to pass through manual gates or automatic toll gates, and based on this setting information, which gates to be passed through is set in the planned travelling roads. Note that gates may be automatically determined according to the state of the in-vehicle device (such as whether a card for passing through automatic toll gates is inserted).

The actuator unit 7 includes an actuator to change the operation amount of the accelerator pedal 8, an actuator to change the operation amount of the brake pedal 9, and an actuator to change the steering angle of the steering wheel 10. In other words, the actuator unit 7 is capable of controlling the driving force, braking force, and steering angle of the host vehicle.

The ECU 1 includes a travel-lane determination unit 11, planned-stop-position detection unit 12, driver-operation detection unit 13, and travel control unit 14, as functional constituents implemented by executing the computer program.

The travel-lane determination unit 11 determines whether the host vehicle is planning to enter a manual-gate traffic lane, based on the position of the host vehicle and information on manual-gate traffic lanes. The planned-stop-position detection unit 12 detects the positions at which the host vehicle is planning to stop, based on information outputted by the external sensor unit 2 and information on manual-gate traffic lanes. Specifically, the planned-stop-position detection unit 12 detects a planned stop position that is before, in the vehicle travel direction, a fee-collection apparatus provided on a manual-gate traffic lane into which fees can be thrown or a booth in which a person in charge of collecting fees is stationed. Hereinafter, fee-collection apparatuses, booths, and the like at which vehicles stop as described above are collectively called "toll booths".

When the travel control unit 14 is not controlling the actuator unit 7, the driver-operation detection unit 13 determines whether the driver is operating (driving) the host vehicle. The travel control unit 14 controls the actuator unit 7 to perform vehicle travel control of the host vehicle. The state where the travel control unit 14 is performing the vehicle travel control for automatically running the host vehicle is called an "automated driving mode", and the state where the travel control unit 14 is not performing the vehicle travel control is called a "manual driving mode". In the manual driving mode, the driver needs to control steering, accelerating, and decelerating of the host vehicle by himself/herself.

Next, a vehicle travel control method performed by the ECU 1 will be described with reference to FIG. 2. Here, it is assumed that the travel control unit 14 is performing the vehicle travel control on the host vehicle according to the guidance of the navigation system 6 based on information on the planned travelling roads. In other words, it is assumed that the host vehicle is in the automated driving mode. The ECU 1 sequentially performs the vehicle travel control illustrated in the flowchart of FIG. 2.

As illustrated in FIG. 2, first the travel-lane determination unit 11 determines whether the host vehicle is planning to enter a manual-gate traffic lane (the host vehicle will enter a manual-gate traffic lane) (S1). The travel-lane determination unit 11 makes the determination by determining the range of a manual-gate traffic lane based on the position of the manual-gate traffic lane, the traffic-lane width, and the length of the manual-gate traffic lane and comparing the position of the host vehicle and the range of the manual-gate traffic lane (S1). In the case where the host vehicle is not planning to enter a manual-gate traffic lane (NO at S1), the process ends. Note that the travel-lane determination unit 11 may obtain information on the planned travelling roads calculated by the navigation system 6 and determine whether the set toll booths that the host vehicle is planning to pass through on the planned travelling roads are located within a specified range from the host vehicle or whether the host vehicle will reach the set toll booths within a specified time (S1).

In the case where the host vehicle is planning to enter a manual-gate traffic lane (YES at S1), the travel control unit 14 disengages the automated driving mode and switches to the manual driving mode to stop controlling the actuator unit 7 (S3).

In the manual driving mode, the driver needs to operate the host vehicle to run it, in other words, the driver needs to drive the host vehicle. Accordingly, the ECU 1 prompts the driver of the host vehicle to perform manual driving by, for example, outputting from the navigation system 6, a voice message such as "Automated driving will be disengaged. Drive the vehicle." (S5). Note that the navigation system 6 may display text or the like on the screen to prompt driving (S5).

Next, the driver-operation detection unit 13 determines whether the driver is driving the host vehicle, based on the opening degree of the accelerator pedal, the control amount of the brake pedal, or the steering angle (S7). For example, in the case where change in the opening degree of the accelerator pedal, the control amount of the brake pedal, or the steering angle continues for a certain time, the driver-operation detection unit 13 determines that the driver is driving the host vehicle (YES at S7), and the process ends. The driver continues to drive the host vehicle. For example, the driver pays a fee, and the host vehicle exits from the manual-gate traffic lane.

In the case where, for example, change in the opening degree of the accelerator pedal, the control amount of the brake pedal, or the steering angle does not continue for a certain time, the driver-operation detection unit 13 determines that the driver is not driving the host vehicle (NO at S7). In this case, the planned-stop-position detection unit 12 tries to detect a planned stop position before the "toll booth" in the vehicle travel direction based on information outputted by the external sensor unit 2 and information on the manual-gate traffic lane (S9).

For example, there is a case where the host vehicle cannot be stopped because there is another vehicle ahead of the host vehicle and before the "toll booth" in the vehicle travel direction (NO at S9). In this case, the ECU 1 outputs a voice warning such as "The vehicle will make an emergency stop." from the navigation system 6, the travel control unit 14 controls the actuator unit 7 to stop the traveling of the host vehicle immediately (S11), and then the process ends.

On the other hand, in the case where, for example, there is no other vehicle before the "toll booth" in the vehicle travel direction, the planned stop position can be detected, and the host vehicle can be stopped at the planned stop position (YES at S9), the process proceeds to step S13.

At step S13, the ECU 1 outputs a voice message such as "The vehicle will travel and stop automatically." from the navigation system 6, the travel control unit 14 controls the actuator unit 7 to stop the host vehicle at the planned stop position (S13), and then the process ends. Note that the navigation system 6 may display text or the like on the screen, such as "The vehicle will travel and stop automatically" (S13).

Next, the structure of a manual-gate traffic lane will be illustrated, and a vehicle travel control method in this embodiment will be described specifically.

Figure 3A:
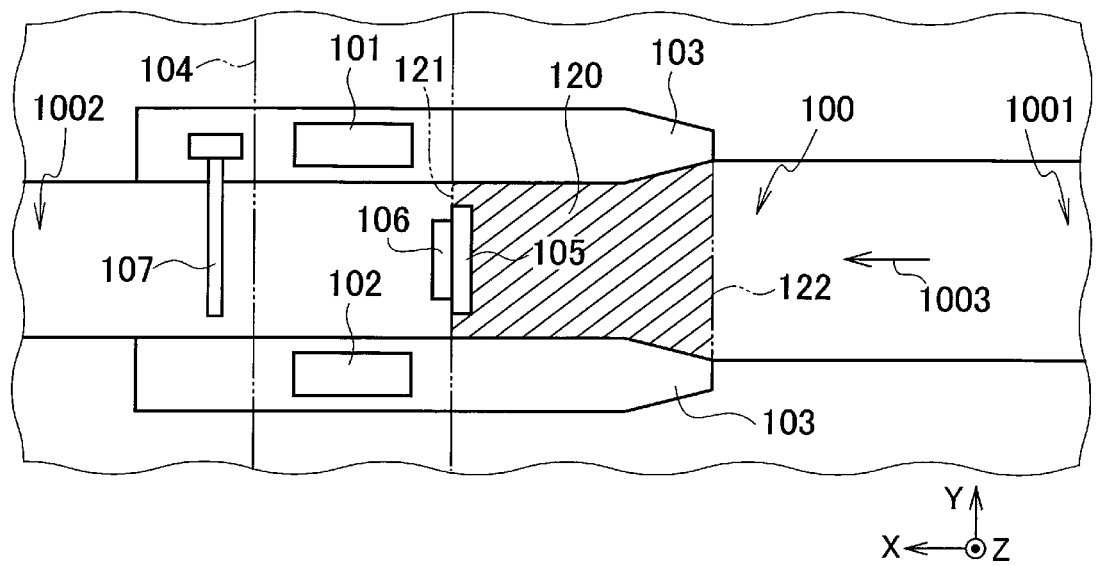
FIG. 3A is a plan view of an example of the structure of a manual-gate traffic lane and a planned stop position.
Figure 3B:
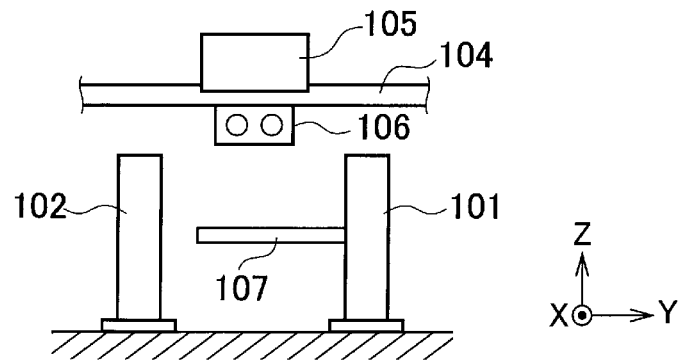
FIG. 3B is a front view of an example of the structure of the manual-gate traffic lane.
Figure 3C:
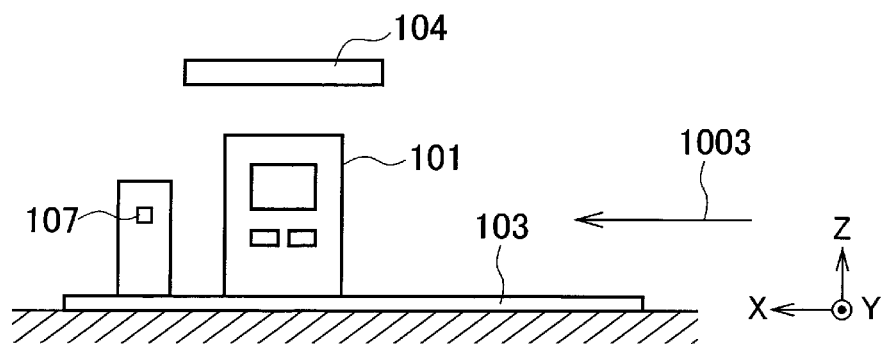
FIG. 3C is a side view of an example the structure of the manual-gate traffic lane.

As illustrated in FIGS. 3A, 3B, and 3C, there is a fee-collection apparatus 101, in other words, a toll booth at which vehicles' occupants perform actions such as paying fees, on a manual-gate traffic lane 100. Here, a toll booth means an apparatus or booth a position adjacent to which (on a side of the toll booth) vehicles are assumed to stop temporarily at. This definition is not dependent on whether there is staff or not and whether money is handled. The toll booths in this definition are not limited to ones for toll roads but include apparatuses or booths for managing the entry and exit of vehicles into and from parking lots or the like. The toll booths in this definition also include apparatuses that automatically issue tickets for entry and apparatuses including a card reader for authenticating drivers' cards for entry and exit. Note that in countries or regions where vehicles travel on the left-hand side of the road, the fee-collection apparatus 101 is positioned on the right side of the manual-gate traffic lane 100 as seen toward the vehicle travel direction 1003. In FIGS. 3A, 3B, and 3C, viewing directions are indicated by X, Y, and Z.

Across the manual-gate traffic lane 100 from the fee-collection apparatus 101 is located a fee-collection apparatus 102 which is for a next manual-gate traffic lane. The fee-collection apparatuses 101 and 102 are on islands 103 which are one step higher than the manual-gate traffic lanes.

The fee-collection apparatuses 101 and 102 are examples of a "toll booth provided on a traffic lane", and a "toll booth provided on a traffic lane" means a toll booth provided to face a traffic lane so that vehicles travelling the traffic lane can perform actions to the toll booth. Vehicles traveling on the manual-gate traffic lane 100 can perform actions to the fee-collection apparatus 101. In other words, the fee-collection apparatus 101 is an example of a toll booth provided to face the manual-gate traffic lane 100 and is a toll booth provided on the manual-gate traffic lane 100. Vehicles traveling on the manual-gate traffic lane 100 cannot perform actions to the fee-collection apparatus 102. In other words, since the fee-collection apparatus 102 is not provided to face the manual-gate traffic lane 100, the fee-collection apparatus 102 is not a toll booth provided on the manual-gate traffic lane 100.

The fee-collection apparatuses 101 and 102 have a common roof 104 above them. A signboard 105 and a traffic signal 106 are attached to end portions of the roof 104 on the near side in the vehicle travel direction such that they can be seen from the near side in the vehicle travel direction. The signboard 105 and the traffic signal 106 are positioned, for example, at end portions of the roof 104 on the near side in the vehicle travel direction.

Near the exit 1002 of the manual-gate traffic lane 100 is located a stop bar 107. As illustrated in FIGS. 3A, 3B, and 3C, when the stop bar 107 is blocking the upper portion of the manual-gate traffic lane 100, vehicles cannot exit from the manual-gate traffic lane 100. When the stop bar 107 is not blocking the lane, vehicles can exit from the manual-gate traffic lane 100.

As illustrated in FIG. 3A, the planned stop position 120 is set to be before the fee-collection apparatus 101 in the vehicle travel direction. The end of the planned stop position 120 on the exit 1002 side is called a target position 121. The rear end of the planned stop position 120 on the near side in the vehicle travel direction is called a target position 122. In other words, the planned stop position 120 is the area between the target position 121 and the target position 122 on the manual-gate traffic lane 100. The target positions 121 and 122 are obtained by processing detection results of the external sensor unit 2.

For example, since the signboard 105 and the traffic signal 106 are positioned before the fee-collection apparatus 101 in the vehicle travel direction, the target position 121 can be set to a position under the signboard 105 and the traffic signal 106. Alternatively, since the end of the roof 104 on the near side in the vehicle travel direction is positioned before the fee-collection apparatus 101 in the vehicle travel direction, the target position 121 may be set to a position under the end of the roof 104 on the near side in the vehicle travel direction.

In this case, the planned-stop-position detection unit 12, for example, detects an area of the signboard 105 or the like from an image ahead of the host vehicle captured by the camera of the external sensor unit 2 and measures the distance between the host vehicle and the signboard 105 or the like based on the change with time in the size of the detected area. The planned-stop-position detection unit 12 sets the target position 121 based on the distance and the position of the host vehicle.

Note that the height of the signboard 105 or the like may be prestored, and the horizontal distance between the host vehicle and the signboard 105 or the like may be determined based on the distance determined from an image and the height.

Alternatively, since the end of the island 103 on the near side in the vehicle travel direction is positioned before the signboard 105 and the traffic signal 106 in the vehicle travel direction, the target position 122 can be set to a side portion of the end of the island 103 on the near side in the vehicle travel direction.

In this case, in the same way as for the target position 121, the planned-stop-position detection unit 12, for example, measures the distance between the host vehicle and the end of the island 103 on the near side in the vehicle travel direction from an image ahead of the host vehicle captured by the camera of the external sensor unit 2. The planned-stop-position detection unit 12 sets the target position 122 based on the distance and the position of the host vehicle.

Note that a highly accurate map storing the outlines of structures such as the signboard 105 and the island 103 may be held in advance. When the target positions 121 and 122 are detected, signals or an image obtained from the radar device or the camera of the external sensor unit 2 are compared with the highly accurate map, and the distance to the structures may be measured using the comparison results.

In addition, for the target positions 121 and 122, the positions obtained by appropriately offsetting the positions obtained by the detection may be used, instead of using them as is.

Figure 4A:
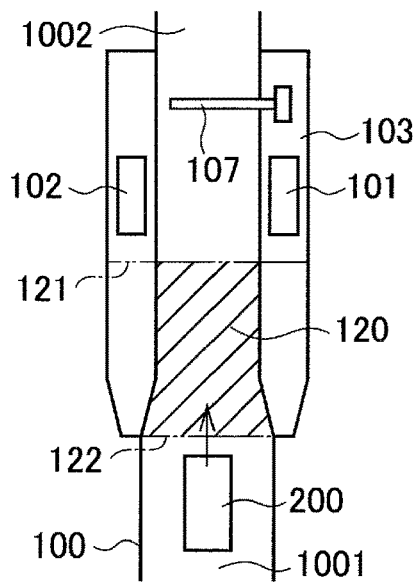
FIG. 4A is a plan view of an example of a state where a vehicle is approaching a planned stop position.

A host vehicle 200 illustrated in FIG. 4A has entered the manual-gate traffic lane 100, and thus the automated driving mode has been disengaged and the host vehicle 200 is in the manual driving mode (S3 in FIG. 2). In the case where the host vehicle 200 is not driven by the driver (NO at S7 in FIG. 2), the travel control unit 14 controls the actuator unit 7 to stop the host vehicle 200 at the planned stop position 120, specifically, between the target position 121 and the target position 122 (S13 in FIG. 2).

Figure 4B:
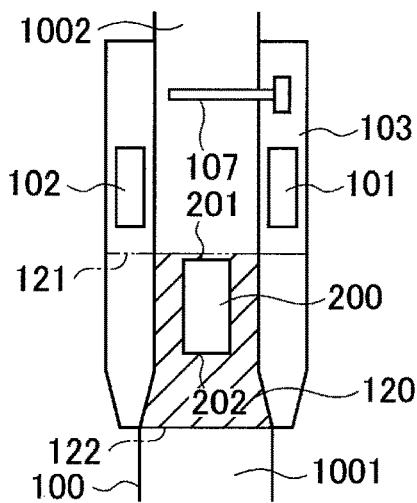
FIG. 4B is a plan view of an example of a state where a vehicle has stopped at the planned stop position.

It is preferable that (condition 1) the front end 201 of the host vehicle 200 be positioned before the target position 121 in the vehicle travel direction and that (condition 2) the rear end 202 of the host vehicle 200 be closer to the exit 1002 of the manual-gate traffic lane 100 than the target position 122, as illustrated in FIG. 4B.

Figure 4C:
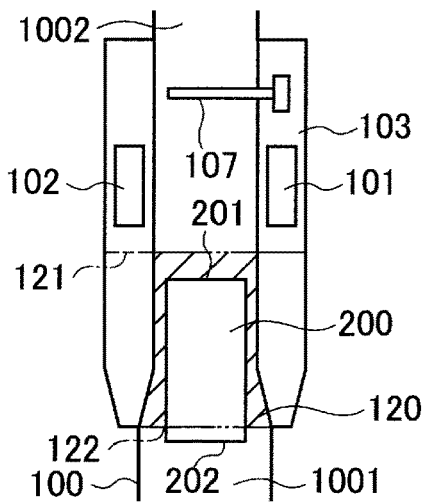
FIG. 4C is a plan view of another example of a state where a vehicle has stopped at the planned stop position.

However, condition 1 may be prioritized over condition 2. As illustrated in FIG. 4C, if the front end 201 of the host vehicle 200 is before the target position 121 in the vehicle travel direction, in other words, if condition 1 is satisfied, the rear end 202 does not need to be closer to the exit 1002 than the target position 122. Specifically, condition 2 does not have to be satisfied.

As described above, the travel control unit 14 automatically stops the host vehicle 200 at the planned stop position 120, which is before the fee-collection apparatus 101 in the vehicle travel direction.

The driver of the host vehicle 200 realizes that he/she needs to drive the host vehicle 200 because it has stopped travelling, and then the driver drives the host vehicle 200 and stops the host vehicle 200, for example, in front of the fee-collection apparatus 101.

Then, if this is a case where the host vehicle 200 enters a toll road, the driver receives a ticket issued from the fee-collection apparatus 101. If this is a case where the host vehicle 200 exits from a toll road, the driver puts a ticket and the fee into the fee-collection apparatus 101 to make payment. Since the fee-collection apparatus 101 issues tickets as described above, the fee-collection apparatus 101 is also called the ticket issuing machine.

When the above action is performed to the fee-collection apparatus 101, the stop bar 107 that has been blocking the manual-gate traffic lane 100 jumps up. The driver starts the host vehicle 200, passes in front of the stop bar 107, and exits from the manual-gate traffic lane 100.

If the driver does not drive the host vehicle 200 remaining in the manual driving mode, the host vehicle 200 would continue traveling with its inertia. If the driver does not receive a ticket, or if the driver does not pay a fee, the stop bar 107 keeps blocking the manual-gate traffic lane 100. In that case, the host vehicle 200 may crash into the stop bar 107. To address this situation, the present embodiment automatically stops the traveling of the host vehicle 200, thereby preventing the host vehicle 200 from crashing into the stop bar 107.

Even if such vehicle travel control is not performed, if the host vehicle 200 is capable of detecting an obstacle ahead and automatically stopping, the host vehicle 200 would detect the stop bar 107 and stop automatically.

However, in that case, the host vehicle 200 would pass by in front of the fee-collection apparatus 101 and could not perform actions such as paying a fee, in other words, the host vehicle 200 would stop at an inappropriate position. Hence, the present embodiment automatically stops the host vehicle 200 at a position before the toll booth, such as the fee-collection apparatus 101, in the vehicle travel direction. Thus, the present embodiment prevents the host vehicle 200 from passing by in front of the fee-collection apparatus 101 and stopping at an inappropriate position.

Meanwhile, there are cases where the toll booth on a manual-gate traffic lane is not a fee-collection apparatus but a booth in which a person in charge of collecting fees is stationed. In addition, there are various kinds of sizes and shapes of fee-collection apparatuses or booths, and the number of kinds is large. For this reason, complicated control is required to set a planned stop position to a position not before the toll booth in the vehicle travel direction and also according to the type of toll booth.

Hence, in the present embodiment, a planned stop position before the toll booth in the vehicle travel direction is detected to stop the host vehicle 200. In the case where a planned stop position is set before the toll booth, the planned stop position can be easily detected from a change with time in an image as described above, eliminating complicated control based on the type of toll booth.

As has been described above, the present embodiment prevents the host vehicle from passing by in front of the toll booth in the case where the host vehicle is supposed to stop at a toll booth (a fee-collection apparatus, a person in charge, or the like) provided on a traffic lane for the occupant to perform actions (such as paying a toll fee, receiving a ticket, putting in a ticket, or receiving a receipt). In other words, the present embodiment makes it possible to perform actions to the toll booth without failing.

In addition, since the vehicle is stopped at a position before the toll booth in the vehicle travel direction in the present embodiment, it is possible to dispense with complicated control based on the type of toll booth. In addition, traveling after that to the position of the toll booth can be left to the driver or the like.

In addition, the present embodiment includes an automated driving mode for automatically running the host vehicle. In the case where passing through a toll booth is planned in the automated driving mode (YES at S1 in FIG. 2), in other words, after it is determined that the host vehicle will enter the traffic lane (YES at S1 in FIG. 2), the driver of the host vehicle is prompted to perform manual driving (S5). Then, after prompting the driver to drive, it is determined whether the driver is driving the host vehicle (S7). If the driver is not driving (NO at S7), the vehicle travel control at step S13 is performed. If the driver is driving the host vehicle (YES at S7), automatically stopping the host vehicle is not performed.

Thus, in the case where the driver is driving (YES at S7), the vehicle travel control at step S13 is not necessary. In other words, in the case where the driver starts driving the vehicle in advance, the vehicle travel control for automatically stopping at a position before the toll booth in the vehicle travel direction is not necessary.

Note that in the present embodiment, steps S3, S5, and S7 in FIG. 2 are not essential. Hence, in the case where the host vehicle is planning to enter a manual-gate traffic lane (YES at S1), the process may proceed directly to step S9. In addition, in the case where there is almost no possibility that the planned stop position cannot be detected, the process may directly move to step S13 without performing step S9.

Although in the present embodiment, the vehicle travel control device is mounted on the target vehicle on which the vehicle travel control is performed, the present invention is not limited to this example. The vehicle travel control device may be mounted on a server device communicable with the target vehicle or on a different vehicle which is not the target vehicle. Necessary information and instructions may be exchanged by the communication between the server device or different vehicle and the target vehicle to remotely perform the same or similar vehicle travel control method. The communication between the server device and the target vehicle can be executed by wireless communication or road-vehicle communication. The communication between the different vehicle and the target vehicle can be executed by what is called vehicle-to-vehicle communication.

Although an embodiment of the present invention has been described above, it should not be understood that the descriptions and drawings constituting part of this disclosure limit the invention. From this disclosure, various alternative embodiments, examples, and operational techniques will be apparent to those skilled in the art.

REFERENCE SIGNS LIST

1 ECU
2 external sensor unit
3 internal sensor unit
4 GPS-radio-wave receiving unit
5 map database
6 navigation system
7 actuator unit
8 accelerator pedal
9 brake pedal
10 steering wheel
11 travel-lane determination unit
12 planned-stop-position detection unit
13 driver-operation detection unit
14 travel control unit
100 manual-gate traffic lane
101, 102 fee-collection apparatus
103 island
104 roof
105 signboard
106 traffic signal
107 stop bar
120 planned stop position
121, 122 target position
200 host vehicle
201 front end of host vehicle
202 rear end of host vehicle
1001 entrance to manual-gate traffic lane
1002 exit from manual-gate traffic lane
1003 travel direction

The invention claimed is:

1. A vehicle travel control method for a vehicle travel control device, comprising:
    determining, using a processor that receives a vehicle position of a vehicle and information on a toll booth, whether the vehicle that is operating in an automated driving mode needs to stop at the toll booth provided in a traffic lane in which the vehicle is going to enter;
    in response to determining that the vehicle needs to stop at the toll booth:
        determining a planned stop position that is at a position in the traffic lane before the toll booth in a travel direction of the vehicle; and
        stopping the vehicle at the planned stop position, wherein the vehicle is stopped at a position in the traffic lane between the toll booth and an end of an island on which the toll booth is provided; and
    in response to determining that the vehicle does not need to stop at the toll booth, operating the vehicle to pass through the toll booth.

2. The vehicle travel control method according to claim 1, comprising:
    in a case where the vehicle is going to pass through the toll booth in the automated driving mode, prompting a driver of the vehicle to perform manual driving.

3. The vehicle travel control method according to claim 2, further comprising:
    after prompting the driver to perform the manual driving, determining whether the driver is driving the vehicle; and
    in a case where the driver is not driving the vehicle, the vehicle is stopped at a position before the toll booth in the travel direction of the vehicle.

4. The vehicle travel control method according to claim 2, further comprising:
    after prompting the driver to perform the manual driving, determining whether the driver is driving the vehicle; and
    in a case where the driver of the vehicle is driving the vehicle, the vehicle is not stopped automatically.

5. The vehicle travel control method according to claim 2, further comprising:
    in a case of switching to a manual driving mode in which the vehicle is driven manually, providing display on a screen for prompting the driver to perform the manual driving.

6. The vehicle travel control method according to claim 1, further comprising:
    in a case where a position at which the vehicle is to be stopped is not recognized, outputting a warning.

7. The vehicle travel control method according to claim 1, wherein
    a target position for stopping the vehicle is set to an end of a roof above the toll booth, a traffic signal provided on the roof, a signboard provided on the roof, or an end of an island on which the toll booth is provided.

8. A vehicle travel control device that automatically stops a vehicle at a planned stop position, comprising:
    a processor that receives output from an external sensor mounted on the vehicle and sets the planned stop position base on the output;
    memory in electronic communication with the processor;
    instructions stored in the memory, the instructions being executable to implement a method comprising:
        determining, using the processor that receives a vehicle position of the vehicle and information on toll booth, whether the vehicle that is operating in an automated driving mode needs to stop at a toll booth provided in a traffic lane in which the vehicle is going to enter;
        in response to determining that the vehicle needs to stop at the toll booth:
            determining the planned stop position that is at a position in the traffic lane before the toll booth in a travel direction of the vehicle; and
            stopping the vehicle at the planned stop position, wherein the vehicle is stopped at a position in the traffic lane between the toll booth and an end of an island on which the toll booth is provided; and
        in response to determining that the vehicle does not need to stop at the toll booth, operating the vehicle to pass through the toll booth.

* * * * *